(12) United States Patent
Walch et al.

(10) Patent No.: US 11,407,176 B2
(45) Date of Patent: Aug. 9, 2022

(54) PUMPING SYSTEM AND METHOD FOR 3D PRINTING

(71) Applicant: Magnum Venus Products, Knoxville, TN (US)

(72) Inventors: Michael D. Walch, Kent, WA (US); Timothy G. Deluca, Kent, WA (US)

(73) Assignee: MAGNUM VENUS PRODUCTS, INC., Knoxville, TN (US)

( * ) Notice: Subject to any disclaimer, the term of this patent is extended or adjusted under 35 U.S.C. 154(b) by 361 days.

(21) Appl. No.: 16/358,768

(22) Filed: Mar. 20, 2019

(65) Prior Publication Data

US 2020/0298491 A1    Sep. 24, 2020

(51) Int. Cl.
| | |
|---|---|
| *B29C 64/321* | (2017.01) |
| *B33Y 10/00* | (2015.01) |
| *B33Y 30/00* | (2015.01) |
| *B33Y 40/00* | (2020.01) |
| *B33Y 70/00* | (2020.01) |
| *B29C 64/314* | (2017.01) |

(Continued)

(52) U.S. Cl.
CPC .......... *B29C 64/321* (2017.08); *B29C 64/106* (2017.08); *B29C 64/209* (2017.08); *B29C 64/314* (2017.08); *B33Y 10/00* (2014.12); *B33Y 30/00* (2014.12); *B33Y 40/00* (2014.12); *B33Y 70/00* (2014.12); *B29K 2031/00* (2013.01); *B29K 2067/00* (2013.01); *B29K 2105/0014* (2013.01)

(58) Field of Classification Search
CPC .............................. B29C 64/321; B33Y 10/00
See application file for complete search history.

(56) References Cited

U.S. PATENT DOCUMENTS 3,277,845 A * 10/1966 Poppe ...................... A21B 5/00
83/342
4,324,014 A *  4/1982 Stutz, Jr. .............. G11B 23/502
360/137

(Continued)

FOREIGN PATENT DOCUMENTS

| CN | 206217172 U | 6/2017 |
|---|---|---|
| CN | 107738441 A | 2/2018 |

(Continued)

OTHER PUBLICATIONS

Extended European Search Report for EP App. No. 20163049.8, dated Jul. 9, 2020, 8 pages.

*Primary Examiner* — Nicholas R Krasnow
(74) *Attorney, Agent, or Firm* — Luedeka Neely Group, PC

(57) ABSTRACT

A three-dimensional (3D) printing system and method for printing with the 3D system. The 3D system includes a pneumatic dispense gun for mixing a thermoset resin and catalyst and dispensing a catalyzed resin to a rotary dispense valve for application of the catalyzed resin to a substrate on a movable table. The dispense gun contains a catalyst injection unit and a mixer for mixing the catalyst with the thermoset resin. The mixer is downstream of the catalyst injection unit and the catalyst injection unit includes a catalyst injector and a distribution ring surrounding the catalyst injector. One or more first pumps are provided for pumping the thermoset resin from a storage container to the pneumatic dispense gun. A second pump is provided for pumping the catalyst from a storage container to the dispense gun.

16 Claims, 5 Drawing Sheets

(51) Int. Cl.
*B29C 64/209* (2017.01)
*B29C 64/106* (2017.01)
*B29K 31/00* (2006.01)
*B29K 67/00* (2006.01)
*B29K 105/00* (2006.01)

(56) References Cited

U.S. PATENT DOCUMENTS

| | | | |
|---|---|---|---|
| 4,692,291 | A | 9/1987 | Angell, Jr. |
| 5,080,283 | A | 1/1992 | Kukesh et al. |
| 5,143,296 | A | 9/1992 | Saurwein et al. |
| 6,523,992 | B1* | 2/2003 | Bublewitz ............ A61C 9/0026 222/145.6 |
| 9,707,717 | B2 | 7/2017 | Sand |
| 2002/0096579 | A1 | 7/2002 | Sinders |
| 2003/0017403 | A1* | 1/2003 | Kokubo ................ B05D 1/265 430/7 |
| 2005/0279763 | A1 | 12/2005 | Adell et al. |
| 2015/0352787 | A1* | 12/2015 | Humbert ............... B29C 64/321 264/489 |
| 2018/0104917 | A1 | 4/2018 | Jin |
| 2018/0264719 | A1 | 9/2018 | Rolland et al. |
| 2018/0327531 | A1 | 11/2018 | Moore et al. |

FOREIGN PATENT DOCUMENTS

| | | |
|---|---|---|
| EP | 2955004 A1 | 12/2015 |
| GB | 1334072 A | 10/1973 |
| WO | 9513878 A1 | 5/1995 |
| WO | 2008151063 A3 | 2/2009 |
| WO | 2016086216 A1 | 6/2016 |
| WO | 2016191329 A1 | 12/2016 |
| WO | 2017112653 A1 | 6/2017 |
| WO | 2017133855 A1 | 8/2017 |
| WO | 2017142867 A1 | 8/2017 |
| WO | 2017194111 A1 | 11/2017 |
| WO | 2018106822 A1 | 6/2018 |

\* cited by examiner

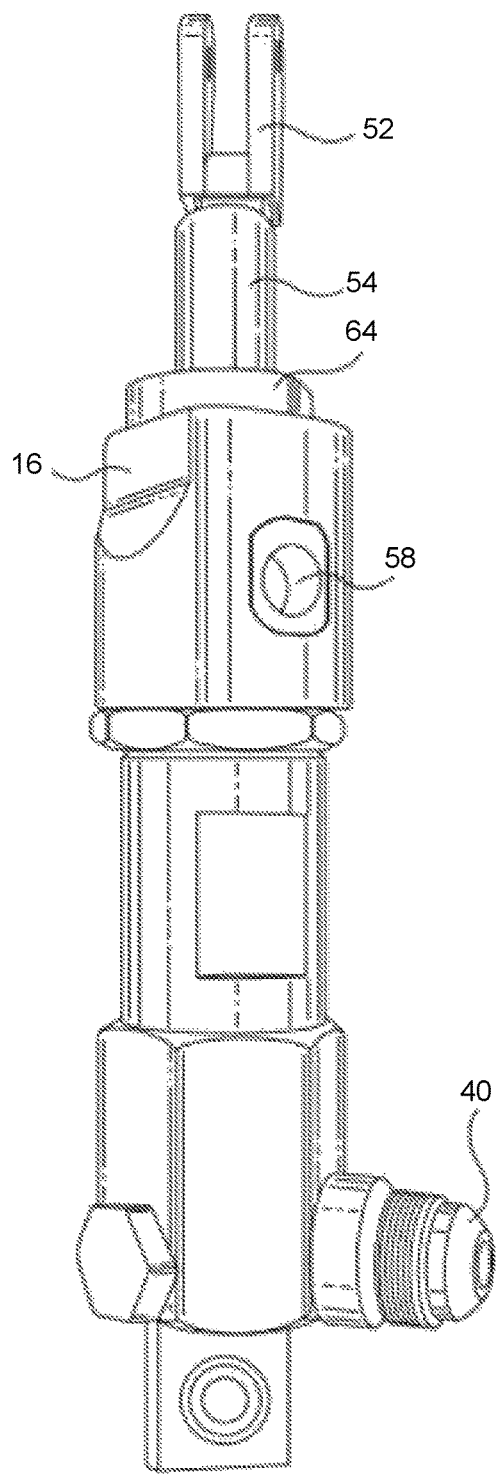
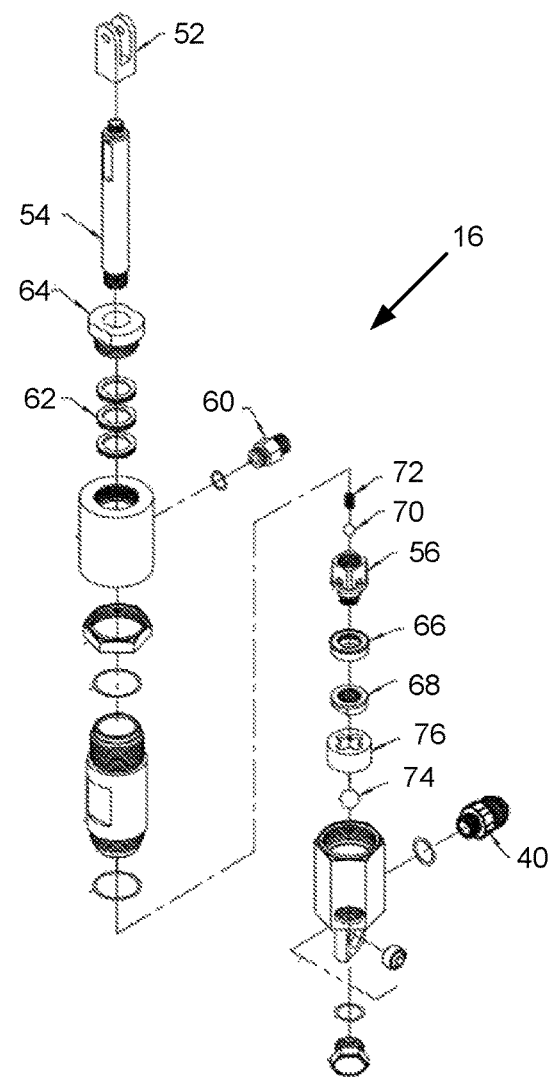
FIG. 3A
FIG. 3B

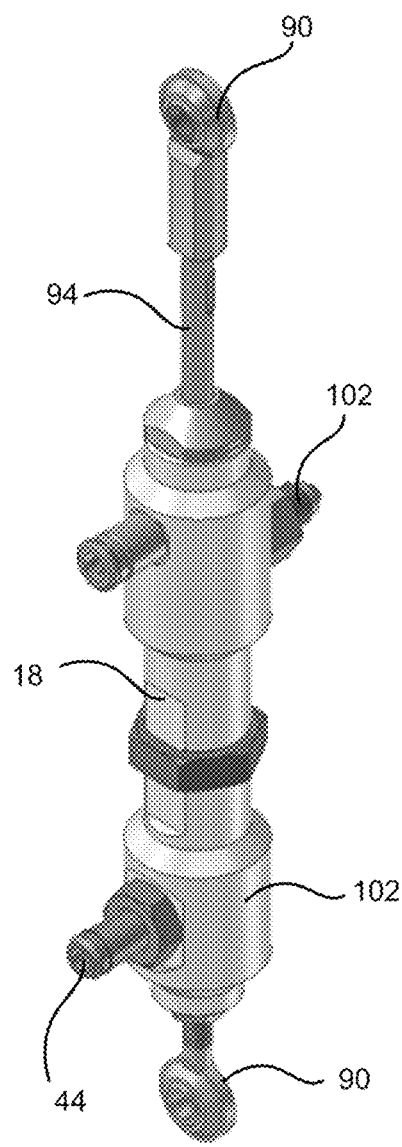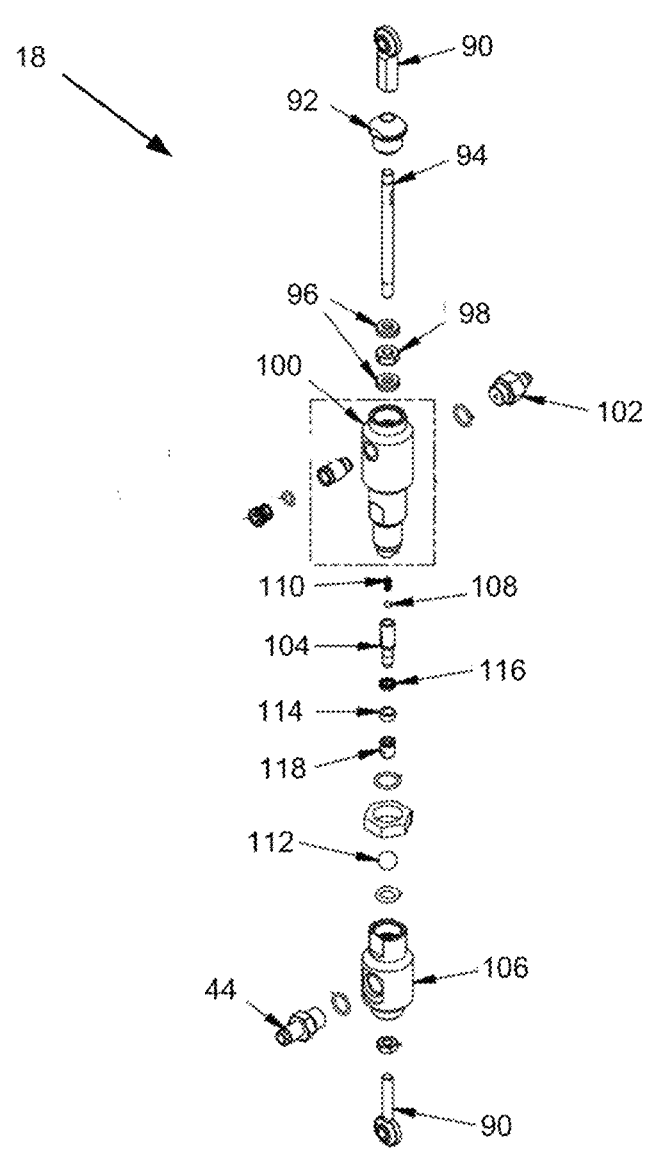
*FIG. 4A*  *FIG. 4B*

PUMPING SYSTEM AND METHOD FOR 3D PRINTING

TECHNICAL FIELD

The disclosure is directed to a three-dimensional (3D) printing system and a method for 3D printing, and in particular to a 3D printing system and method for printing with a thermoset resin material and catalyst.

BACKGROUND AND SUMMARY

Polyester and vinyl ester putties have been available to the fiberglass reinforced plastics (FRP) industry for a number of years. The fillers used in these resins are wide ranging, common fillers, including fumed silica, calcium carbonate, glass and plastic micro bubbles to name a few.

Polyester and vinyl ester materials are typically used in two processes. The majority of the processes use the foregoing material for bonding (gluing) applications where the putty is applied to a cured laminate, and a second laminate or core is then pressed into the putty until the putty is cured. The other process uses the foregoing material to manufacture FRP tooling or molds. The putty is applied to a frame work and cured. Once the putty is cured, the putty is machined down to a desired shape. This is the only process using a polyester putty system where a net shape is achieved after machining.

The three-dimensional printing systems may be used to deposit thermoset resins on a substrate rather than having to machine the cured thermoset resins. Some thermoset resins, such as epoxy and urethane resin systems, are two-component systems wherein the two components of each system are dispensed typically in a 1:1 volume ratio. Accordingly, it is relatively easy to dispense and mix such two-component systems and achieve suitable results.

However, the epoxy and urethane resins systems are relatively more expensive than polyester and vinyl ester resins. The polyester and vinyl ester resin systems use a catalyst initiator to induce curing of the resins. A typical catalyst initiator is methyl ethyl ketone peroxide (MEKP). However, the challenge of using polyester or vinyl ester resin systems for 3D printing applications is to properly mix and meter the components to achieve suitable curing of the resins. The components of such a 3D printing system have widely varying viscosities and flow rates making it difficult, if not impossible to use the conventional dispensing systems used for epoxy and urethane thermoset resins. For example, the polyester or vinyl ester putties have viscosities ranging from about 1,000,000 cps to as high as 6,000,000 cps. MEKP has a viscosity of about 15 cps. The volume ratio of MEKP to the putties typically ranges from about 1:99 to about 2:98 percent, thus requiring extremely low flow rates for the MEKP relative to the flow rates of the polyester or vinyl ester resins in a 3D printing system. Accordingly, what is needed is a 3D printing system that is suitable for dispensing polyester or vinyl ester resins and catalyst to a substrate in order to eliminate or reduce the need to machine the cured thermoset resin composition.

In view of the foregoing, embodiments of the disclosure provide a three-dimensional (3D) printing system and method for printing with the 3D system. The 3D system includes a pneumatic dispense gun for mixing a thermoset resin and catalyst and dispensing a catalyzed resin to a rotary dispense valve for application of the catalyzed resin to a substrate on a movable table. The dispense gun contains a catalyst injection unit and a mixer for mixing the catalyst with the thermoset resin. The mixer is downstream of the catalyst injection unit and the catalyst injection unit includes a catalyst injector and a distribution ring surrounding the catalyst injector. One or more first pumps are provided for pumping the thermoset resin from a storage container to the pneumatic dispense gun. A second pump is provided for proportionally pumping catalyst from a storage container to the dispense gun. The pneumatic dispense gun and rotary valve are disposed on a gantry that moves in an x and y direction above the movable table and the movable table moves in a z direction.

In one embodiment, there is provided a method for printing a three-dimensional (3D) object using a thermoset resin. The method includes providing a three-dimensional (3D) printing system including a pneumatic dispense gun for mixing a thermoset resin and catalyst and dispensing a catalyzed resin to a rotary dispense valve for application of the catalyzed resin to a substrate on a movable table. The dispense gun contains a catalyst injection unit and a mixer for mixing the catalyst with the thermoset resin. The mixer is downstream of the catalyst injection unit and the catalyst injection unit includes a catalyst injector and a distribution ring surrounding the catalyst injector. One or more first pumps are provided for pumping the thermoset resin from a storage container to the pneumatic dispense gun. A second pump is provided for pumping the catalyst from a storage container to the dispense gun. The pneumatic dispense gun and rotary valve are disposed on a gantry that moves in an x and y direction above the movable table and the movable table moves in a z direction. Catalyst and resin are pumped to the dispense gun and intimately mixed to provide the catalyzed resin. The catalyzed resin is then dispensed to a rotary dispense valve for dispensing the catalyzed resin onto the substrate to form the 3D object as the gantry and movable table move.

In some embodiments, the second pump and at least one of the one or more first pumps are ball-check positive displacement pumps. In other embodiments, the one or more first pumps has a volume ratio relative to the second pump of about 98:2 to about 99:1 by volume.

In some embodiments, the catalyst injector comprises a spring-loaded plunger valve.

In other embodiments, the pneumatic spray gun is fixedly mounted to the gantry above the movable table containing the substrate. In some embodiments, the rotary valve is movably mounted on a linear slide for movement in z direction to a dispense position toward the movable table and in an opposite direction away from the movable table to a rest position.

In some embodiments, the thermoset resin is selected from polyester resins and vinyl ester resins. In other embodiments, the catalyst is methyl ethyl ketone peroxide (MEKP).

In still other embodiments, the rotary dispense valve includes a flush liquid fitting for flushing the rotary dispense valve between 3D printing sessions.

BRIEF DESCRIPTION OF THE DRAWINGS

Further features, advantages and benefits of the disclosed embodiments may be evident by reference to the attached drawings in combination with the following disclosure.

FIG. 3A is a perspective view of a resin pump for use with the system of FIG. 1 according to the disclosure.

FIG. 3B is an exploded view of the resin pump of FIG. 3A.

FIG. 4A is a perspective view of a catalyst pump for use with the system of FIG. 1 according to the disclosure.

FIG. 4B is an exploded view of the catalyst pump of FIG. 4A

DETAILED DESCRIPTION OF EXEMPLARY EMBODIMENTS

Figure 1:
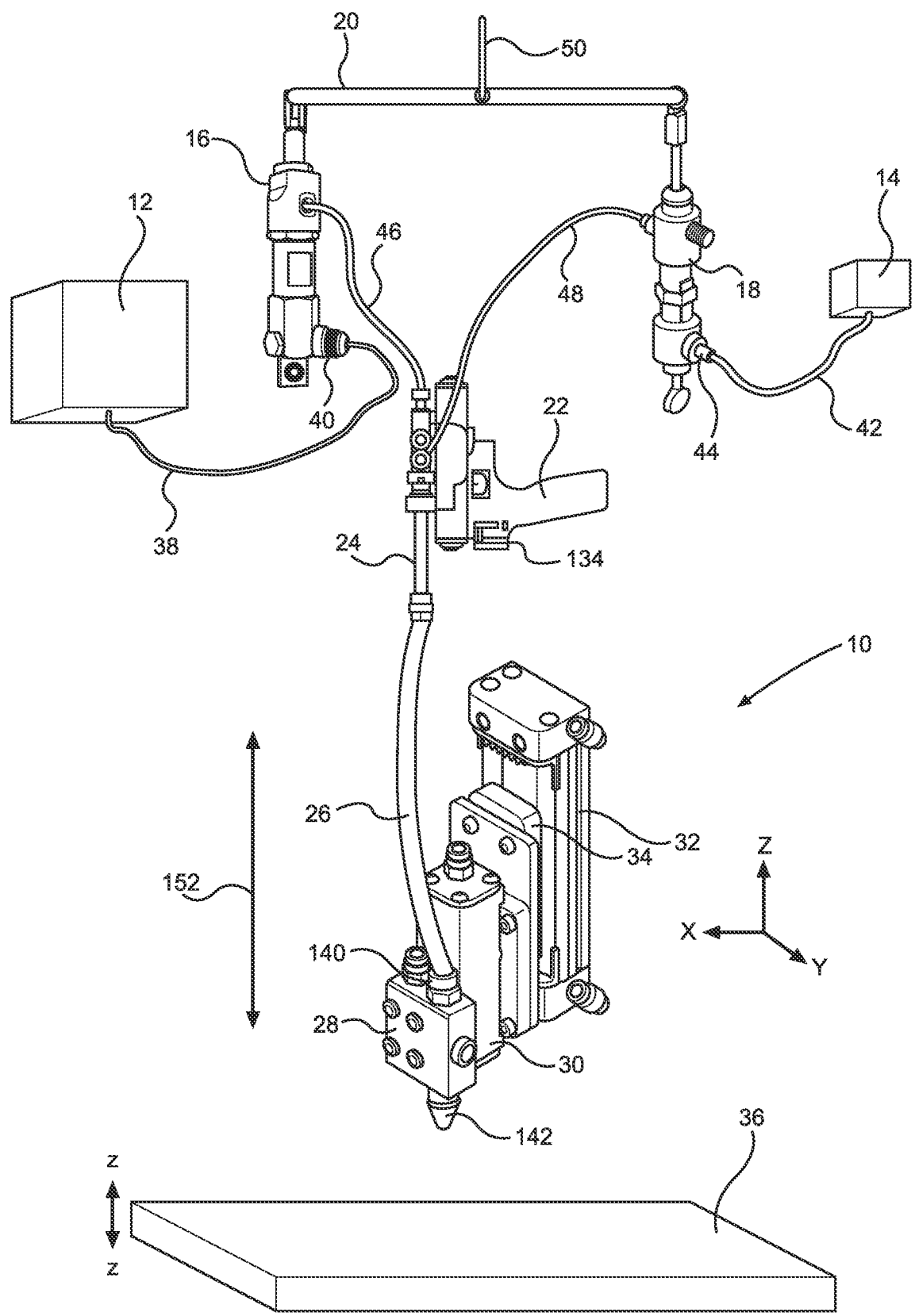
FIG. 1 is somewhat schematic drawing, not to scale, of a three-dimensional (3D) printing system according to the disclosure.

With reference to FIG. 1, there is shown an overall illustration of the three-dimensional (3D) printing system 10 according to the disclosure. The main components of the system 10 include a resin supply 12, a catalyst supply 14, a resin pump 16, a catalyst pump 18, pump linkage 20, a dispense gun 22, a mixer 24 attached to the dispense gun, a flexible hose 26 from the dispense gun 22 to a rotary dispense valve 28, an actuator 30 for the rotary dispense valve 28, a rodless slide 32, a slide plate 34 for the rotary slide actuator 30 on the rodless slide 32 and a movable table 36 for supporting and moving a substrate in a z direction for deposition of a 3D object thereon from the 3D system 10.

Figure 2A:
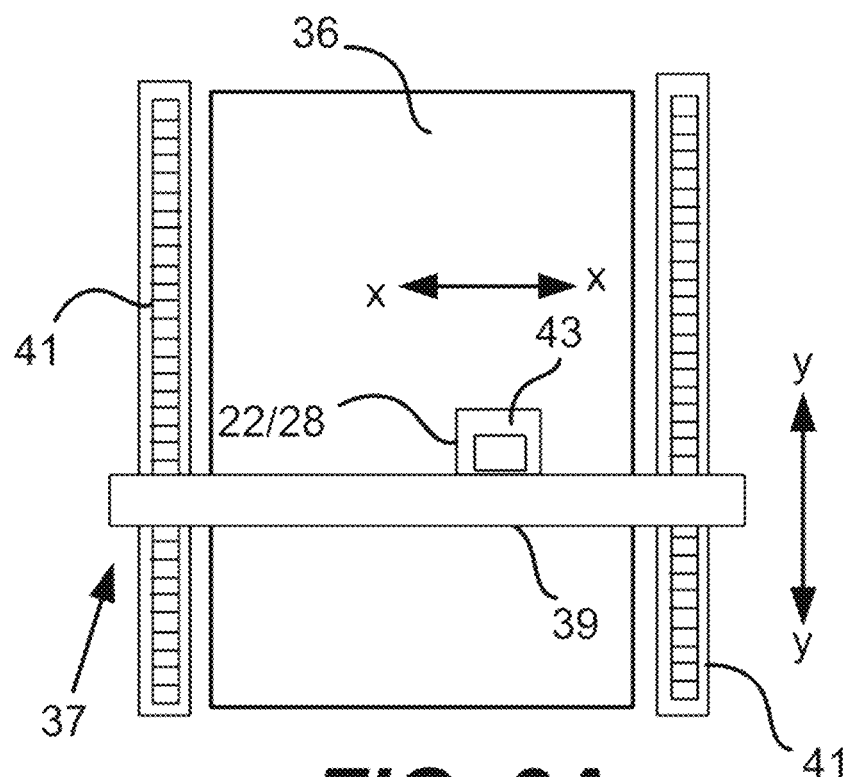
FIG. 2A is a schematic plan view, not to scale, of a gantry and movable table for the 3D printing system of FIG. 1.
Figure 2B:
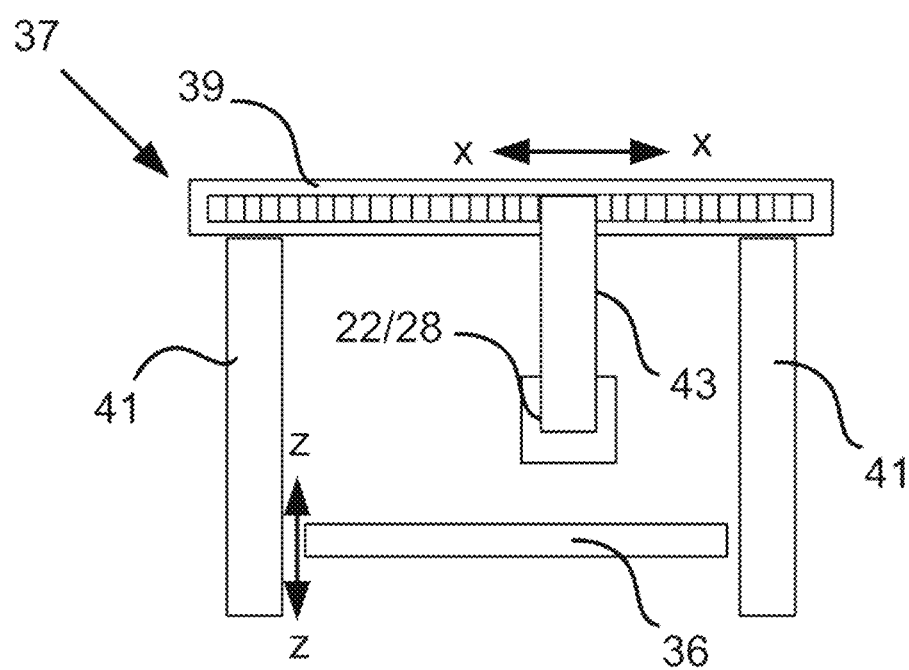
FIG. 2B is a schematic elevational view, not to scale, of the gantry and movable table of FIG. 2A.

The dispense gun 22 and rotary dispense valve 28 are mounted on a gantry 37 as illustrated schematically in FIGS. 2A and 2B. The gantry 37 includes a movable top rail 39 that moves in an y direction along rails 41 and a support arm 43 for the dispense gun 22 and rotary dispense valve 28 that moves in an x direction along the top rail 39. As described in more detail below, the dispense gun 22 is fixedly mounted to the support arm 43 of the gantry 37 and the rotary dispense valve 28 moves in a z direction from a rest position away from the movable table 36 to a dispense position toward the movable table 36.

Referring again to FIG. 1, there is a hose connection 38 from the resin supply 12 to an inlet 40 of the resin pump 16. Likewise, there is a hose connection 42 from the catalyst supply 14 to an inlet 44 of the catalyst pump 18. The pump linkage 20 is connected to both the resin pump 16 and the catalyst pump 18 to simultaneously pump resin and catalyst into the dispense gun through hoses 46 and 48. The pump linkage 20 may be connected via connection rod 50 to a balanced hydraulic pump (not shown) that is used to drive the pump linkage 20 connected to both pumps 16 and 18 to provide a consistent volume ratio of catalyst to thermoset resin. The balanced hydraulic pump speed is controlled by a programmable logic controller in a computer attached to the system 10. The catalyst pump 18 may be adjustable in order to provide the correct volume ratio of catalyst to resin for curing polyester or vinyl ester resins. In the case of polyester or vinyl ester resin, the volume ratio of catalyst to resin ranges from about 2:98 to about 1:99 by volume.

The resin supply 12 may include a drum pump (not shown) that force feeds the resin into the resin pump 16. The resin typically has an extremely high viscosity ranging from about 1,000,000 to about 6,000,000 cp. By contrast, the catalyst supply may be gravity fed into the catalyst pump 18. The catalyst has a viscosity that is typically about 15 cp. The pump linkage 20 ensures that the resin and catalyst are fed at substantially the same time to the dispense gun.

Further details of the resin pump 16 are illustrate in FIGS. 3A and 3B. The resin pump 16 includes a clevis 52 for attaching the resin pump 16 to the pump linkage 20. A piston rod 54 that is attached to a piston body 56 pushes resin material from the inlet 40 to the outlet 58 through outlet fitting 60. Resin is prevented from leaking out of the pump 16 by a combination of packing 62 and a packing nut 64 as well as piston seal 66 and seal retainer 68.

The outlet side of the piston body 56 includes a ball check valve 70 and spring 72. Toward the inlet 40 of the pump there is also a ball check valve 74 and ball retainer 76.

The catalyst pump 18 has a similar construction to that of the resin pump 16 but is designed to handle a much smaller volume than the resin pump 16. The catalyst pump 18 is shown in detail in FIGS. 4A and 4B and includes ball joints 90 for connection to the pump linkage 20 and a support structure (not shown), a retaining nut 92, a piston rod 94, a piston rod seal assembly 96, a seal spacer 98, an outlet body 100, an outlet fitting 102 attached to the outlet body 100, and a piston body 104 that is attached to the piston rod 94 for pushing catalyst from the inlet 44 attached to the inlet body 106 to the outlet 102 attached to the outlet body 100. Like the resin pump 16, the catalyst pump 18 also contains a ball check valve 108 on the outlet side of the piston body 104, and a ball check valve 112 on the inlet side of the piston body 104. There is a piston guide 114, piston seal 116 and piston seal retainer 118 attached to the piston body 104.

In some embodiments, a ram chop-check type pump is provided for pumping the thermoset resin from the resin storage container to a resin pump which may be a ball check pump with spring loaded and caged inlet ball. Due to the high viscosity of the thermoset resin it must be force fed from the storage container to the resin pump. The resin pump is provided for proportionally pumping the thermoset resin to the pneumatic dispense gun. The resin pump and the catalyst pump are adjustable in relation to each other in order to provide control over volumetric proportions or mix ratios of the thermoset resin to catalyst.

Figure 5:
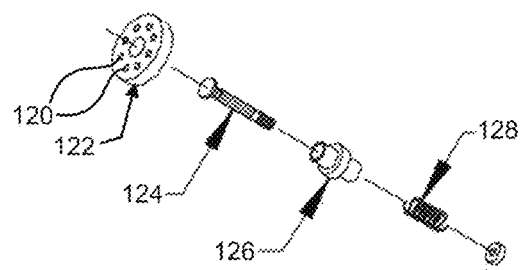
FIG. 5 is an exploded view of a distribution ring and catalyst injector for contacting the resin with the catalyst in a dispense gun for the system of FIG. 1.

The resin pump 16 and the catalyst pump 18 pump materials for the thermoset resin formulation to a rotary valve in the dispense gun 22. The rotary valve and dispense gun are conventional devices used for spraying a variety of resin mixtures, such as the dispense gun disclosed in U.S. Pat. No. 5,143,296, which is incorporated herein by reference as if fully set forth herein. In the dispense gun 22, the resin flows through holes 120 in a distribution ring 122 (FIG. 5) and the catalyst is injected through the center of the distribution ring 122 by a spring-loaded catalyst injector that includes an injector plunger 124, an injector body 126, and a spring 128. The catalyst injector acts as a check valve so no resin can back up into the catalyst inlet stream. The rotary valve in the dispense gun provides the proper mixture of resin and catalyst to be combined as resin and catalyst are pumped by the resin pump 16 and catalyst pump 18 to the dispense gun 22.

Figure 6:
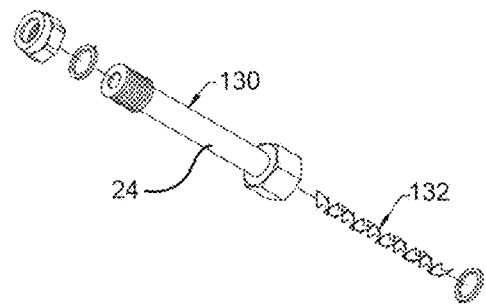
FIG. 6 is an exploded view of a static mixer for mixing resin and catalyst discharging from the dispense gun for the system of FIG. 1.

The discharge of the catalyst and resin mixture from the dispense gun 22 passes through one or more static mixers 24 as shown in FIG. 6. The static mixer 24 includes a mixer body 130 containing a mixer insert 132 for intimately mixing the resin and catalyst before the mixture is discharged from the dispense gun 22 through the flexible hose 26 to the rotary dispense valve 28. The dispense gun 22 is operated by a solenoid valve that operates a trigger 134 on the dispense gun 22.

Figure 7:
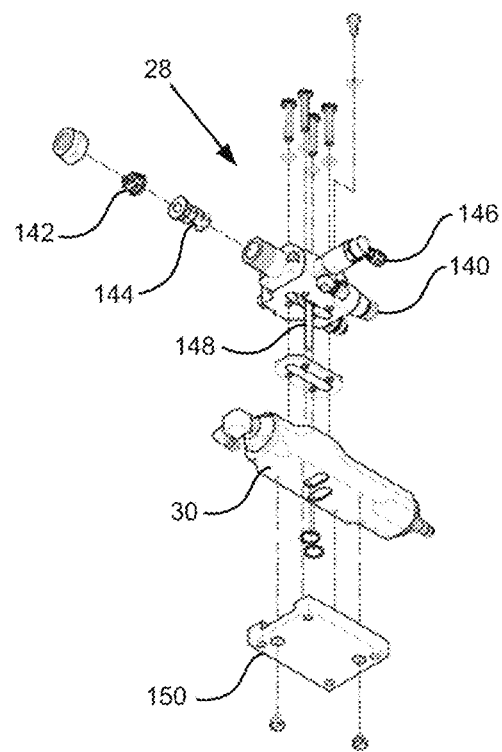
FIG. 7 is an exploded view of a rotary dispense valve and actuator for the 3D printing system of FIG. 1.

Details of the rotary dispense valve 28 and actuator 30 for the rotary dispense valve 28 are shown in FIG. 7. Mixed resin and catalyst from the dispense gun 22 flows through hose 26 to an inlet 140 of the rotary dispense valve 28 and then through an outlet nozzle 142 of the rotary dispense valve 140 onto a substrate on the movable table 36. In some embodiments, the outlet of the rotary dispense valve may contain a static mixer 144 adjacent to the outlet nozzle 142. Flush valve connection 146 is preferably included on the rotary dispense valve 28 to flush catalyzed resin material from the rotary dispense valve 28 once ejection of the catalyst resin is complete.

The actuator 30 for the rotary dispense valve 28 is a pneumatically operated reciprocating actuator 30 that has an internal piston that moves a stem 148 attached to the rotary dispense valve to rotate the valve through open and closed positions. The actuator 30 is attached by means of a mounting plate 150 to the rodless slide 32. The rodless slide 32 is fixedly mounted to the support arm 43 of the gantry 37 so that the rotary valve 28 can be moved toward and away from the movable table 36. The mounting plate 150 is attached to the slide plate 34 of the rodless slide 32. In use, the rodless slide 32 causes the rotary dispense valve 28 and actuator therefor to move linearly from a first rest position to a resin dispense position as indicated by arrow 152 (FIG. 1).

All of the wetted components of the resin mixing and dispense system 10 described above are made of resin-resistant and catalyst-resistant materials such as stainless steel or other steel alloys. The entire pumping and dispense system may be pneumatically operated or hydraulically operated to provide dispensing of the catalyzed resin. In some applications, the pumps and actuators may be electrically operated, however, pneumatic systems are preferred.

In some embodiments, compressed air charge accumulators may be used downstream of each of the resin pump 16 and catalyst pump 18. The accumulators may assist in reducing pressure caused by momentary loss of pump rod velocity during pump reversal. The linkage 20 for the pumps 16 and 18 may be driven by a hydraulic pump to a balanced hydraulic cylinder.

An important feature of the disclosed embodiments is the use of the rotary dispense valve 28 rather than the dispense gun 22 to apply catalyzed thermoset resin to a substrate. Without the rotary dispense valve 28, a small amount of catalyzed resin material under pressure would continue to flow out of the static mixer 24 when the dispense gun 22 is turned off. However, once the rotary dispense valve 28 is closed by the actuator 30, there remains only a minimal amount of catalyzed resin in the rotary dispense valve 28 and outlet nozzle 142 therefor. Also, the rotary dispense valve 28 can be flushed with a solvent to remove any remaining catalyzed resin.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A three-dimensional (3D) printing system comprising:
   a pneumatic dispense gun for mixing a thermoset resin and catalyst and dispensing a catalyzed resin to a rotary dispense valve for application of the catalyzed resin to a substrate on a table, the dispense gun comprising;
   a catalyst injection unit comprising a catalyst injector and a distribution ring surrounding the catalyst injector; and
   a mixer for mixing the catalyst with the thermoset resin, wherein the mixer is downstream of the catalyst injection unit;
   one or more first pumps for pumping the thermoset resin from a first storage container to the pneumatic dispense gun; and
   a second pump for pumping the catalyst from a second storage container to the dispense gun,
   wherein the pneumatic dispense gun and rotary valve are disposed on a gantry that moves relative to the table.

2. The 3D printing system of claim 1, wherein the second pump and at least one of the one or more first pumps are each ball-check positive displacement pumps.

3. The 3D printing system of claim 1, wherein the catalyst injector comprises a spring-loaded plunger valve.

4. The 3D printing system of claim 1, wherein the pneumatic dispense gun is fixedly mounted on the gantry above the table containing the substrate, and the rotary dispense valve moves in a z direction from a rest position away from the table to a dispense position toward the table.

5. The 3D printing system of claim 4, wherein the rotary dispense valve is movably mounted on a linear slide for movement to the dispense position and opposite movement to the rest position.

6. The 3D printing system of claim 1, wherein the rotary dispense valve further comprises a flush liquid fitting for flushing the rotary dispense valve between 3D printing sessions.

7. The 3D printing system of claim 1, wherein the thermoset resin is selected from the group consisting of polyester resins and vinyl ester resins.

8. The 3D printing system of claim 1, wherein the catalyst comprises methyl ethyl ketone peroxide (MEKP).

9. The 3D printing system of claim 1, wherein the one or more first pumps is configured to have a pumping volume relative to a pumping volume of the second pump that provides a pumping volume ratio of the one or more first pumps to the second pump of about 98:2 to about 99:1 by volume.

10. A method for printing a three-dimensional (3D) object using a thermoset resin comprising:
provided a three-dimensional (3D) printing system including a pneumatic dispense gun for mixing the thermoset resin and a catalyst and dispensing a catalyzed resin to a rotary dispense valve for application of the catalyzed resin to a substrate on a table, the dispense gun comprising a catalyst injection unit and a mixer for mixing the catalyst with the thermoset resin, wherein the mixer is downstream of the catalyst injection unit and the catalyst injection unit comprises a catalyst injector and a distribution ring surrounding the catalyst injector; one or more first pumps for pumping the thermoset resin from a first storage container to the pneumatic dispense gun; and a second pump for pumping the catalyst from a second storage container to the dispense gun, wherein the pneumatic dispense gun and rotary valve are disposed on a gantry that moves in an x and y direction above the table;
pumping the catalyst and the thermoset resin to the pneumatic dispense gun;
intimately mixing the thermoset resin and the catalyst to provide the catalyzed resin;
dispensing the catalyzed resin to the rotary dispense valve; and
dispensing the catalyzed resin from the rotary dispense valve onto the substrate to form the 3D object as the gantry moves relative to the table.

11. The method of claim 10, wherein the thermoset resin is selected from the group consisting of polyester resins and vinyl ester resins.

12. The method of claim 10, wherein the catalyst comprises methyl ethyl ketone peroxide (MEKP).

13. The method of claim 10, wherein the pneumatic dispense gun is fixedly mounted on the gantry above the table containing the substrate, and the rotary dispense valve is movably mounted on a linear slide for movement in z direction to a dispense position toward the table and in an opposite direction away from the table to a rest position, further comprising, moving the rotary dispense valve to the dispense position adjacent to the substrate for dispensing the catalyzed resin onto the substrate.

14. The method of claim 10, wherein the second pump and at least one of the one or more first pumps are each ball-check positive displacement pumps.

15. The method of claim 10, wherein the catalyst injector comprises a spring-loaded plunger valve.

16. The method of claim 10, wherein a volume ratio of catalyst to resin pumped to the pneumatic dispense gun ranges from about 2:98 to about 1:99 by volume.

* * * * *